Feb. 6, 1962  A. B. HAAPALA  3,019,721
DEVICE FOR FACILITATING THE COOKING OF BACON
Filed May 14, 1959

INVENTOR.
ARTHUR B. HAAPALA

United States Patent Office 3,019,721
Patented Feb. 6, 1962

3,019,721
DEVICE FOR FACILITATING THE COOKING OF BACON
Arthur B. Haapala, Long Beach, Calif., assignor of one-tenth to Gadget-Of-The-Month Club, Inc., North Hollywood, Calif., a corporation of California
Filed May 14, 1959, Ser. No. 813,222
1 Claim. (Cl. 99—400)

The present invention consists of a device for facilitating the cooking of a plurality of strips of bacon in an oven or broiler and adapted to prevent the bacon from curling during the cooking thereof in the manner customarily encountered when cooking bacon in conventional frying pans, or the like. In one preferred form, the device of the present invention includes a drip pan having a substantially flat bottom wall and an upstanding edge wall means therearound, and additionally including a perforate bacon support rack having a substantially flat bacon-engageable top portion of smaller horizontal dimensions than the drip pan and being provided with a plurality of spaced downwardly directed rests adapted to removably rest upon the top surface of the flat bottom of the drip pan; said top portion of said bacon-engageable support rack being adapted to receive on the upper surface thereof and effectively support a plurality of strips of bacon which are effectively covered by a perforate bacon cover member which is adapted to rest upon the tops of the plurality of bacon strips carried by the bacon support rack to maintain them in position and to prevent them from curling during a cooking operation.

It is an object of the present invention to provide a device of the general character described above, wherein the bacon cover member is provided with handle means (preferably, though not necessarily, insulated and centrally positioned with respect to the bacon cover member) whereby to facilitate the positioning of the bacon cover member on top of a plurality of bacon strips before cooking same and whereby to facilitate the removal of said bacon cover member after completion of a bacon cooking operation.

It is a further object to provide a device of the character referred to above wherein the drip pan is provided with a grease-egress spout to facilitate pouring grease out of the pan after completion of a bacon-cooking operation.

It is a further object to provide a device of the character referred to above, wherein the top portion of the bacon support rack consists of a plurality of transversely spaced longitudinal wire members effectively connected at opposite ends thereof in a direction transverse to the longitudinal direction of the parallel wires and having two longitudinally spaced parallel transversely directed downwardly extending substantially V-shaped portions formed out of the longitudinal wires and comprising the rests mentioned hereinabove, whereby to provide a structure capable of receiving on the upper surface thereof, and effectively supporting, a plurality of strips of bacon extending thereacross in side-by-side relationship.

It is a further object to provide a device of the character referred to above, wherein the bacon cover member consists of a plurality of transversely spaced longitudinal wire members provided with an encircling member extending completely therearound and interconnecting adjacent ends of the spaced parallel wire members, whereby to provide a structure adapted to rest upon a plurality of strips of bacon carried by the top portion of the bacon-engageable support rack to maintain them in position thereon and to prevent them from curling during a cooking operation.

It is a further object to provide a device of the character set forth in any of the preceding objects, which is of extremely simple, cheap, foolproof construction such as to be conducive to widespread use of the device.

Further objects will be apparent to persons skilled in the art after a careful study hereof.

For the purpose of clarifying the nature of the present invention, one exemplary embodiment is illustrated in the hereinbelow-described figures of the accompanying single sheet of drawings, and is described in detail hereinafter.

In the specific embodiment of the invention illustrated, the above-mentioned drip pan takes one specific form, indicated generally at 10, wherein it is of thin-sheet metallic construction having a substantially rectangular, as seen in plan view, flat bottom wall 11 and four upstanding edge walls 12 integrally laterally interconnected at four corner portions and integrally connected with the substantially rectangular bottom wall 11, and defining between adjacent edge walls forming one of the four corner portions, a grease-egress spout, indicated at 13, adapted to facilitate pouring grease out of the drip pan 10 after completion of a bacon-cooking operation.

Figure 1:
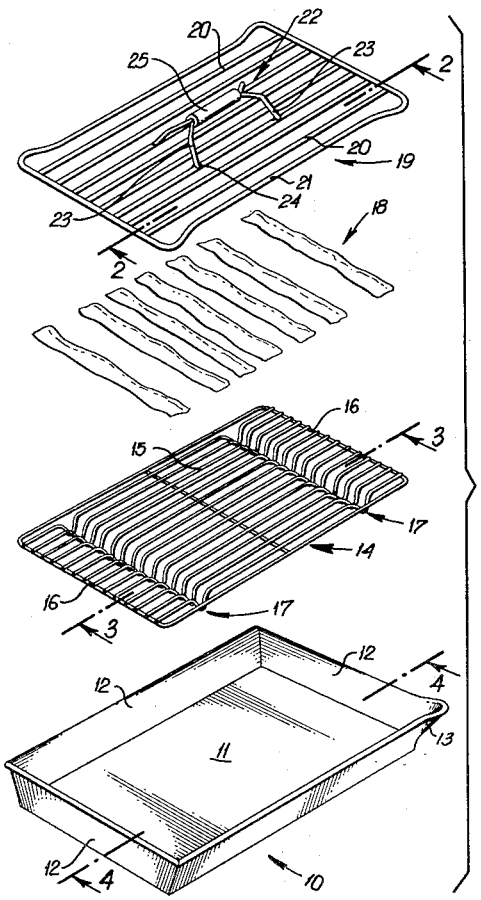
FIG. 1 is a reduced-size, vertically exploded, perspective view of one exemplary form of the invention.
Figure 2:
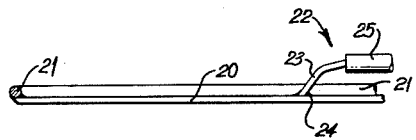
FIG. 2 is a fragmentary sectional view of the bacon cover member shown at the top of FIG. 1, taken in the direction of the arrows 2—2 of FIG. 1.
Figure 3:
FIG. 3 is a fragmentary sectional view of the bacon-engageable support rack shown in FIG. 1, taken in the direction of the arrows 3—3 of FIG. 1.
Figure 4:
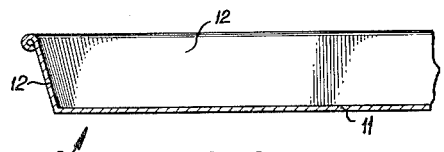
FIG. 4 is a fragmentary sectional view of the drip pan shown in FIG. 1, taken in the direction of the arrows 4—4 of FIG. 1.
Figure 5:
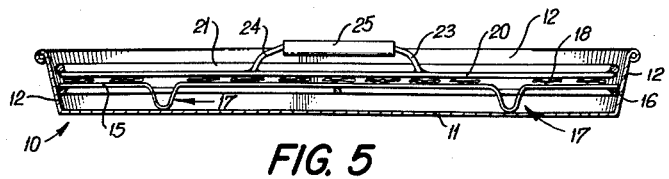
FIG. 5 is a sectional view of the complete assembled device shown in FIGS. 1-4 along a vertical plane coincident with that shown at 2—2 in FIG. 1, at 3—3 in FIG. 1, and at 4—4 in FIG. 1. In other words, this view shows the complete assembled device taken along section lines similar to those along which FIGS. 2, 3, and 4 were taken.

Also, in the specific embodiment illustrated in the figures, the above-mentioned perforate bacon support rack takes one specific form, as indicated generally at 14, wherein it has a substantially rectangular perforate bacon-engaging top portion of smaller horizontal dimensions than the drip pan, and consists of a plurality of transversely spaced longitudinal wire members 15 effectively connected at opposite ends thereof, as indicated at 16, in a direction transverse to the longitudinal direction of the parallel wire members 15, and having two longitudinally spaced parallel transversely directed downwardly extending substantially V-shaped portions, indicated generally at 17, and each being formed out of the plurality of transversely spaced longitudinal wires 15 and comprising rests adapted to contact the top surface of the flat bottom 11 of the drip pan 10 in the manner best shown in FIG. 5, whereby to effectively position the top portion of the bacon-engageable support rack 14 above the bottom 11 of the drip pan 10 so that grease cooked out of a plurality of strips of bacon, such as indicated generally at 18, can effectively drain onto the bottom wall 11 of the pan while the bacon strips 18 resting on the longitudinal members 15 positioned substantially above the bottom wall 11 of the pan will be effectively maintained out of the grease.

It should be noted that the end portions 16 and the extreme side longitudinal members 15 are adapted to be positioned very closely adjacent to the corresponding side walls 12 of the drip pan 10 when inserted thereinto in the position shown in FIG. 5.

Also, in the specific embodiment illustrated in the figures, the above-mentioned perforate bacon cover member takes one specific form, as indicated generally at 19, wherein it comprises a plurality of transversely spaced longitudinal wire members 20 provided with an encircling member 21 extending completely therearound and interconnecting adjacent ends of the spaced parallel wire members 20 whereby to provide a structure adapted to rest upon the plurality of strips of bacon 18 in the manner shown in FIG. 5 when said strips of bacon are carried by the plurality of longitudinal wire members 15 comprising the top portion of the bacon-engageable support rack 14, whereby to maintain the strips of bacon 18 in the proper cooking position, as shown in FIG. 5, and to prevent them from curling during a cooking operation.

In the specific example illustrated, the bacon cover member, indicated generally at 19, is provided with handle means, indicated generally at 22, which takes one specific form wherein it comprises four upwardly directed supporting members 23, each connected, such as by suitable welding, or the like, as indicated at 24, to appropriate spaced portions of the longitudinal wire members 20 and each being connected at the top with respect to an insulated handle portion 25, which is effective centrally symmetrically located with respect to the entire bacon cover member 19, whereby to facilitate positioning and removal of the bacon cover member 19 from the top of a plurality of strips of bacon 18 prior to and subsequent to a bacon cooking operation.

It will readily be understood that the device of the present invention, when placed in operative relationship with respect to a plurality of bacon strips 18 in the manner shown in FIG. 5, may be placed within an oven or broiler to allow the bacon strips 18 to be effectively cooked while being maintain in a substantially straight configuration with substantially no curling of the bacon being allowed by reason of the fact that it is constrained between the top surface of the bacon-engageable support rack 14 and the bottom surface of the bacon cover member 19.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

It should be noted that the downwardly projecting rests need not be limited to two transversely directed rows of downwardly bent portions, but may merely comprise four such downwardly bent portions transversely and longitudinally spaced apart.

I claim:

A device for facilitating the cooking of bacon in a noncurling manner, comprising: a drip pan having a substantially flat rectangular bottom wall, four connected upstanding edge walls connected to said bottom wall and defining four corner portions, one of which is provided with a grease-egress spout; a substantially rectangular perforate bacon support rack having a substantially flat rectangular bacon-engageable top portion within the drip pan comprising a plurality of transversely spaced longitudinal parallel wire members effectively connected at opposite ends thereof in a direction transverse to the longitudinal direction of the parallel wire members and having two longitudinally spaced parallel transversely directed downwardly extending substantially V-shaped portions formed out of the plurality of transversely spaced longitudinal wires and defining downwardly directed rests removably resting upon the top surface of the bottom wall of the drip pan; and a substantially rectangular perforate bacon cover member provided with upwardly projecting handle means and having a substantially flat rectangular bacon-engageable bottom portion substantially co-extensive in area with the underlying bacon-engageable top portion of the bacon support rack removably positioned within the drip pan supported by said underlying bacon-engageable top portion of the bacon support rack, said bacon cover member comprising a plurality of longitudinal parallel wire members transversely spaced differently from the transverse spacing of the longitudinal wire members of the bacon support rack's top portion and provided with an encircling member extending completely therearound and interconnecting adjacent ends of said spaced parallel wire members.

References Cited in the file of this patent

UNITED STATES PATENTS

| | | |
|---|---|---|
| 1,751,726 | Dibble | Mar. 25, 1930 |
| 1,906,999 | Parker | May 2, 1933 |
| 2,066,749 | Trank | Jan. 5, 1937 |
| 2,199,303 | Damon | Apr. 30, 1940 |
| 2,200,335 | Ingersoll | May 14, 1940 |
| 2,480,458 | Fleck | Aug. 30, 1949 |